Patented Sept. 14, 1926.

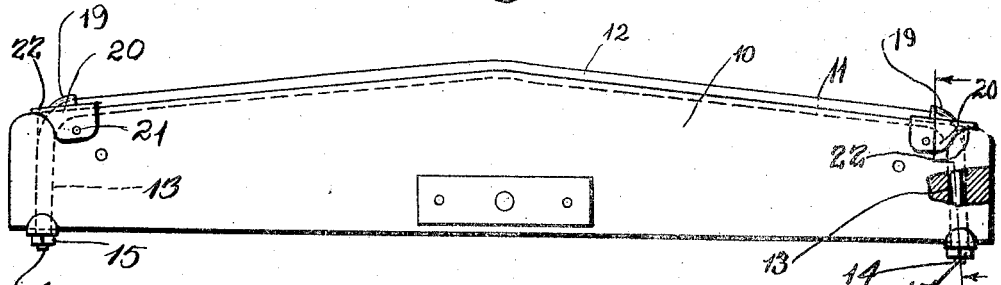
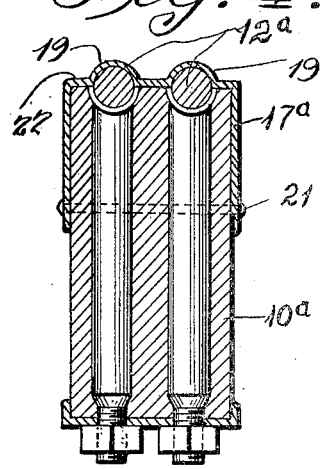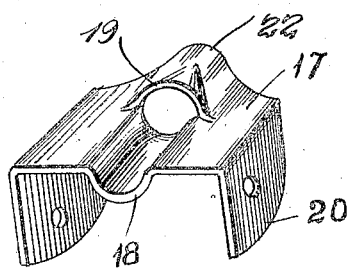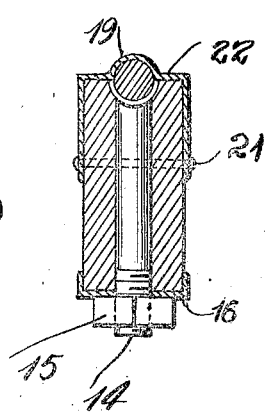
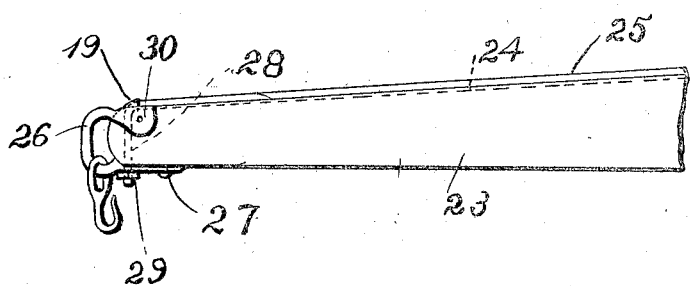

1,599,724

UNITED STATES PATENT OFFICE.

EDWARD SCHRUTH, ALBERT SCHRUTH, AND JOHN SCHRUTH, OF PEPIN, WISCONSIN.

DRAFT DEVICE.

Application filed September 24, 1925. Serial No. 58,335.

This invention relates to draft devices for animal drawn vehicles, implements and the like, and is applicable to eveners, trees, such as the double trees, whiffletrees or the like, as those skilled in the art will understand, and therefore in referring to eveners or whiffletrees, the terms are intended to comprehend any draft rigging on which the invention may be installed.

It is an object of this invention to produce novel means for strengthening the materials employed in the manufacture or formation of eveners and trees in order that wood, which would not ordinarily be satisfactory for use in the manufacture of such draft riggings, owing to its lack of strength due to imperfections or character of the wood, may be used and made to produce satisfactory results.

It is a further object of this invention to produce means whereby holes formed in the bodies of these draft riggings for the reception of bracing rods or the like may be guarded to restrict the entrance of water to the said holes; and it is furthermore an object to strengthen the material at the edges of the holes to prevent splitting of the wood.

It is furthermore an object of the invention to produce guards of the character indicated which will coact with bracing rods, the said guards serving as brace retaining means and as strengthening devices for the bodies of the draft riggings.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of an evener with a device embodying the invention applied thereto;

Figure 2 illustrates a sectional view on the line 2—2 of Fig. 1;

Figure 3 illustrates a perspective view of the aperture guard and brace seat;

Figure 4 illustrates a sectional view showing a guard for two braces;

Figure 5 illustrates a view in elevation of a fragment of the swingletree embodying a modification.

In these drawings, 10 denotes the body of the evener, although any draft rigging such as a doubletree may be likewise provided with an equipment which is to be described, and the said body has a groove 11 in its edge which constitutes a seat for the reinforcing or bracing rod 12. The body has an aperture 13 near each end extending edgewise, and each aperture receives an angularly disposed end 14 of the brace rod. Each end of the brace rod is preferably threaded to receive a nut 15 that bears against a cliplike plate 16 that embraces the edge of the body in order that the structure may be strengthened. Where the groove 11 merges with the apertures there is a curved surface and the bracing rod is, of course, curved where the end 14 diverges.

In order to guard each aperture and prevent undue passage of water into it, a relatively tight joint is formed between the parts, through the employment of a plate at each aperture, which plate 17, in the present embodiment of the invention, has a concave or grooved surface 18 near one end and a convex surface 19 at the opposite end, which forms a clearance for the reception of the brace or rod at the junction of the groove and each hole. The plate has side flanges 20 which lie against the sides of the body, and the plate is secured in place by a fastening 21 such as a rivet or the like, extending through the sides of the plate and through the body.

It will be seen from an inspection of Fig. 1 that the plate has an extension 22 beyond the convex portion and this extension or tail serves to cover the hole on the edge having the groove. Aside from the fact that the plate protects the hole, it acts as a brace to strengthen the structure, as has been described.

In the formation of the plate, the concave portion thereof corresponds to the contour of the groove 11 and the said concave portion lies in the said groove in which the brace is seated.

In the modification shown in Fig. 4, the plate 17ª is of identical construction to the plate 17, except that provision is made for receiving two brace rods 12ª in two grooves formed in the body 10ª, but otherwise the description of the plate intended for use in association with two or more braces would be associated with devices practically like those described in connection with the disclosure of the device shown in Figs. 1, 2 and 3.

In extending the principle of the invention to a tree such as a swingletree, the body or tree proper 23 has a groove 24 for the reception of the brace 25 and the tug iron 26 has an extension 27 at one end which engages the edge of the tree and is apertured in alinement with an aperture 28 formed in the tree, through which an angularly disposed end of the brace projects and in which it is secured by a nut 29. In forming the aperture 28 and having it merge with the slot in which the brace rod is seated, the same conditions with respect to the edge of the opening will be presented as having been described in connection with the disclosure of the evener. The inventors have therefore provided the other end of the tug iron with an extension 30 which, to all intents and purposes from the standpoint of practice, is substantially the construction of the plate illustrated in Fig. 3, and the parts thereof will bear the same relation to the aperture and seat of the brace rod as the parts of the plate 18 occupy with respect to similar parts entering into the construction of the evener, and it is believed unnecessary to describe this in detail, since those skilled in the art will understand how the extension 30 would be shaped to have it of the same configuration as the plate shown in Fig. 3.

We claim:

1. In a draft device, a body having apertures extending from one edge to the other at its ends, a brace extending longitudinally of the body and having angularly disposed ends projecting through the said apertures, and a plate interposed between the brace and the said body at each of the aforesaid apertures, the said plate having an opening through which the brace projects and the said plate having a downwardly curved portion at one edge of the opening forming a clearance for the reception of the brace and an upwardly curved portion overlying the aperture of the body and that portion of the brace in the aperture.

2. In a draft device, a body having apertures extending from one edge to the other near the ends thereof, a brace extending longitudinally of the body and having angularly disposed ends extending through the apertures, a plate interposed between the brace and the said body at each of the aforesaid apertures, the said plate having an opening through which the brace projects and the said plate having an extension overlying the unoccupied portion of the aperture and that portion of the brace in the aperture, and flanges on said plate extending in engagement with the sides of the body and secured thereto.

3. In a draft rigging, a body having apertures extending edgewise therethrough, a brace having angularly disposed ends projecting through the apertures, tug irons, one of which is adapted to be applied to each end of the body, the said tug irons each having an extension at one end engaging the edge of the body and through which the end of the brace projects, means for securing the brace therein, a plate-like extension integral with the other end of the said tug iron having an aperture therethrough for the reception of the brace, the said extension having a concave and a convex portion through which the brace rod extends from the edge of the body to the aperture thereof.

EDWARD SCHRUTH.
ALBERT SCHRUTH.
JOHN SCHRUTH.